(12) United States Patent
Hoffjann et al.

(10) Patent No.: US 7,926,505 B2
(45) Date of Patent: Apr. 19, 2011

(54) TRANSFER UNIT

(75) Inventors: Claus Hoffjann, Hamburg (DE); Harald Gruendel, Hamburg (DE)

(73) Assignee: Airbus Deutschland GmbH (DE)

( * ) Notice: Subject to any disclaimer, the term of this patent is extended or adjusted under 35 U.S.C. 154(b) by 556 days.

(21) Appl. No.: 11/525,003

(22) Filed: Sep. 21, 2006

(65) Prior Publication Data

US 2007/0068575 A1    Mar. 29, 2007

Related U.S. Application Data

(60) Provisional application No. 60/719,349, filed on Sep. 22, 2005.

(30) Foreign Application Priority Data

Sep. 22, 2005 (DE) .......... 10 2005 045 343

(51) Int. Cl.
*F16T 1/20* (2006.01)
(52) U.S. Cl. .................. 137/192; 244/129.1
(58) Field of Classification Search .......... 137/907, 137/412, 413, 414, 389, 215, 216, 216.1, 137/216.2, 192; 251/65, 26, 30.01
See application file for complete search history.

(56) References Cited

U.S. PATENT DOCUMENTS

| 3,766,933 | A | * | 10/1973 | Nicholson, Jr. ............. 137/116.3 |
| 4,275,470 | A | * | 6/1981 | Badger et al. ...................... 4/316 |
| 4,715,561 | A | * | 12/1987 | Spinosa et al. ............. 244/129.1 |
| 5,062,441 | A | | 11/1991 | Glukhov |
| 6,152,160 | A | * | 11/2000 | Bowden Wilcox et al. ......................... 137/15.01 |
| 6,776,183 | B1 | | 8/2004 | Brooker et al. |

FOREIGN PATENT DOCUMENTS

| DE | 3026763 | 2/1981 |
| GB | 2121079 | 12/1983 |

OTHER PUBLICATIONS

Office Action from corresponding German Application 10 2005 045 343.0-22, dated Apr. 6, 2009.

* cited by examiner

*Primary Examiner* — Craig M Schneider
(74) *Attorney, Agent, or Firm* — Lerner, David, Littenberg, Krumholz & Mentlik, LLP

(57) ABSTRACT

In present-day aircraft a drain mast is used on the underside of the fuselage in order to discharge grey water to the external environment. According to an exemplary embodiment of the present invention there is no need to provide such a drain mast in that a transfer unit is used as a connection unit, and buffer storage spaces are used between the wash basins and the vacuum waste-water system. The transfer unit comprises a self-opening valve with a floating body for automatic discharge. This purely mechanical function and the simple design result in low susceptibility to malfunction and in a long service life.

10 Claims, 1 Drawing Sheet

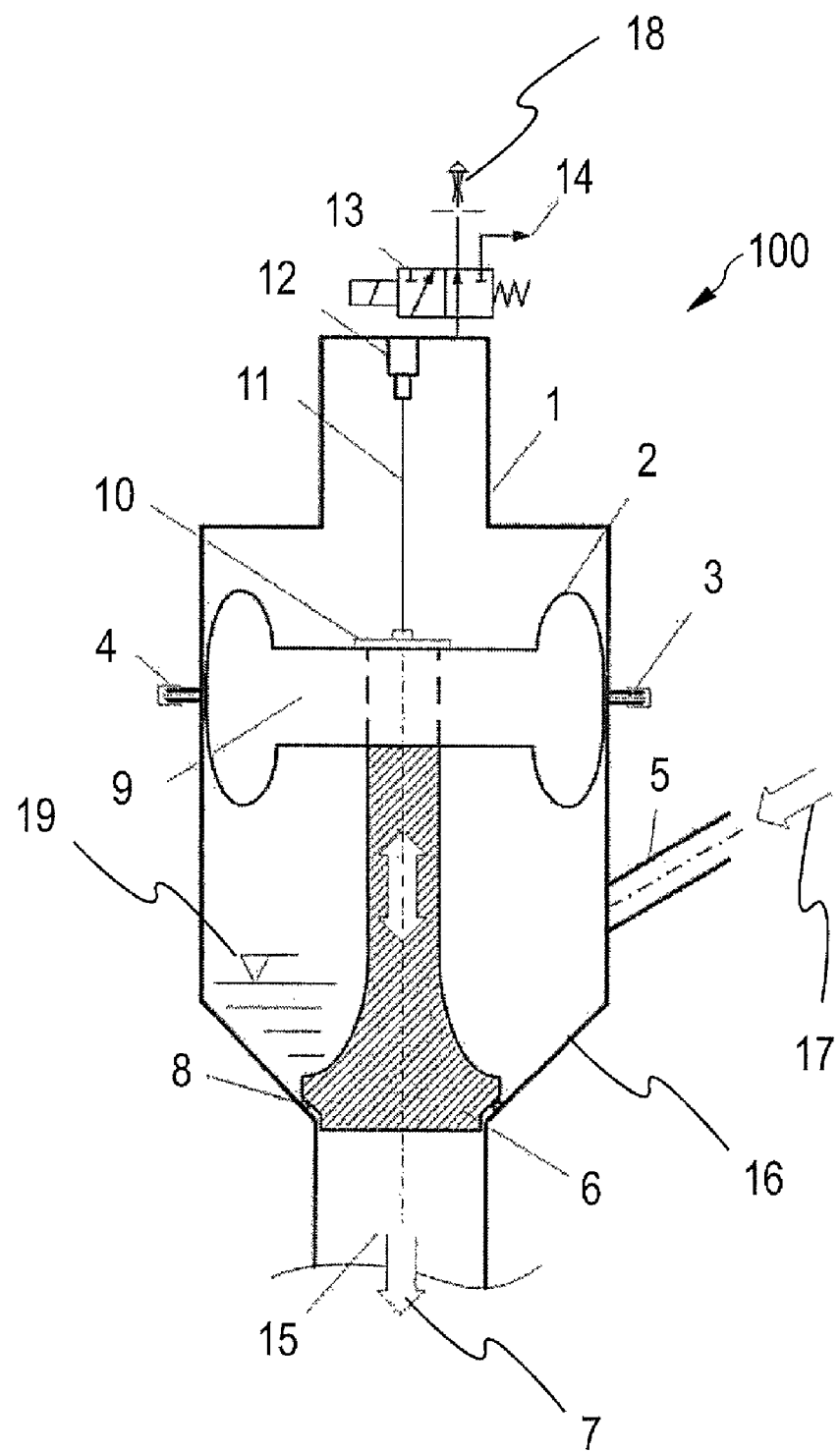

TRANSFER UNIT

CROSS-REFERENCE TO RELATED APPLICATIONS

This application claims the benefit of the filing date of U.S. Provisional Patent Application No. 60/719,349 filed Sep. 22, 2005, the disclosure of which is hereby incorporated herein by reference.

BACKGROUND OF THE INVENTION

The present invention relates to grey water disposal in vehicles. In particular, the present invention relates to a transfer unit for a vehicle, for the disposal of grey water from a wash basin to a vacuum waste-water system, to the use of such a transfer unit in an aircraft, to an aircraft comprising such a transfer unit, and to a method for the disposal of grey water from a wash basin to a vacuum waste-water system.

The term "grey water" refers to water that arises from the use of wash basins, wherein in conventionally applied aircraft technology the arising grey water is drained to the environment by way of a drain mast arranged on the underside of the fuselage.

Such a drain mast forms a connection between the waste water system and the outside (the aircraft's environment). Consequently, this requires, for example, an opening in the fuselage structure. To prevent this opening from causing loss of stability in the structure, additional reinforcements are necessary, which lead to an increase in weight. Furthermore, such an opening results in turbulence and thus serves to increase the air resistance or air drag, which results in a reduction in the cruising speed and/or in increased kerosene consumption. Furthermore, due to the low exterior temperature, icing of the drain mast may occur—a situation which can lead to failure of the drainage system as a result of a blockage in the drain mast.

SUMMARY OF THE INVENTION

It is an object of the present invention to provide improved grey water disposal for vehicles, in particular for aircraft.

According to an exemplary embodiment of the present invention, a transfer unit for a vehicle, for the disposal of grey water from a wash basin to a vacuum waste-water system is stated, wherein the transfer unit comprises a first connection designed and/or arranged and/or adapted for connecting the transfer unit to an outlet of the wash basin, a second connection designed for connecting the transfer unit to the vacuum waste-water system, and a self-opening valve with a floating body, designed for independent drainage of grey water, which has been held in interim storage in the transfer unit, from a wash basin to a vacuum waste-water system when the grey water held in interim storage in the transfer unit exceeds a predetermined fill level height.

As a result of this design of the transfer unit, which is connected on the one hand to the wash basin and on the other hand to the vacuum waste-water system, an interim storage space for grey water is provided, which storage space can be independently emptied when a certain fill level height has been reached. In this arrangement, emptying the transfer unit takes place sequentially (whenever a certain volume of liquid from the wash basin has flowed into the transfer unit). When the predetermined fill level height of the transfer unit has been reached, the valve opens in that it is pulled upwards by the floating body that floats in the grey water held in interim storage. After this, at least partial drainage of the transfer unit to the vacuum waste-water system takes place so that after this (following automatic closing of the valve) further interim storage of water used for washing (grey water) can take place.

Consequently, there is no longer any need to provide a drain mast.

According to a further exemplary embodiment of the present invention the self-opening valve further comprises a valve disc for sealing the second connection, so that after a complete seal has been established no grey water flows from a buffer storage space of the transfer unit to the vacuum waste-water system.

For example, the valve disc is arranged underneath the floating body and is connected to said floating body in such a manner that when the floating body rises (floats), said valve disc is pulled upwards so that the second connection to the vacuum waste-water system opens.

According to a further exemplary embodiment of the present invention the floating body comprises a roll membrane, wherein said roll membrane is designed for rolling off an inside of the housing and for sealing a transition between the floating body and the inside of the housing.

For example, as a result of the floating body floating (and as a result of the associated upwards movement), rolling of the roll membrane on the inside of the housing is enforced so that a force that acts against the rolling direction is generated (for example because the membrane extends as a result of rolling, and corresponding tension forces arise). The tension forces or restoring forces resulting from rolling cause the floating body with the roll membrane (and thus the entire valve) to attempt to move downwards. As soon as the pressure of the water from below ceases (because the water has drained off) the valve will thus independently move downwards, thus closing off the outlet to the vacuum waste-water system.

Of course, other return mechanisms are also possible, for example the use of spring elements against which the floating body has to work when moving upwards, as are rubber elements or the like.

According to a further exemplary embodiment of the present invention, the transfer unit further comprises a control valve block with a vacuum connection, wherein the control valve block is designed for opening the valve as desired, and wherein the control valve block for opening the valve sucks the floating body upwards so that the valve disc moves away from the second connection, thus releasing the vacuum waste-water system.

According to this exemplary embodiment of the present invention an additional opening mechanism in the form of a control valve block is provided. The control valve block can, for example, be controlled externally so that the valve can be opened as desired. In this process a vacuum connection to the interior of the housing is opened so that the floating body is sucked upwards as a result of the vacuum, thus opening the outlet to the vacuum waste-water system.

According to a further exemplary embodiment of the present invention the roll membrane provides the floating body with inner stability.

For example, the roll membrane can be designed as an essential component of the floating body and can define the shape of said floating body in a decisive way.

According to a further exemplary embodiment of the present invention the roll membrane provides a defined restoring force to the floating body with the valve disc, from an open position back to a closed position.

This can, for example, be achieved in that tensile forces arise as a result of the roll membrane rolling (when the floating body is moved upwards). The tensile forces can, for example, arise as a result of the roll membrane extending during rolling. Furthermore, the use of corresponding rubber elements or spring elements is possible.

According to a further exemplary embodiment of the present invention the transfer unit comprises a top housing part and a bottom housing part, which housing parts are disconnectably connected by way of a connecting-flange seal.

It is thus possible to open the housing of the transfer unit, for example to carry out maintenance, cleaning or an exchange of the valve, or to carry out maintenance, cleaning or an exchange of the floating body only.

According to a further exemplary embodiment of the present invention the transfer unit further comprises a bistable electromagnet, which in the case of insufficient energy supply or in the case of a system failure automatically pulls the floating body with the valve disc upwards so that the valve disc moves away from the second connection, thus releasing the vacuum waste-water system.

For example, if it is no longer supplied with power, or if a corresponding relay switches in the case of insufficient energy supply, the electromagnet pulls the floating body and thus the entire valve upwards. This is, for example, made possible in that the bistable electromagnet attempts to take up a corresponding stable position if power is no longer available, or if the relay has switched. In this way emergency opening of the transfer unit in the case of an emergency is ensured.

According to a further exemplary embodiment of the present invention the valve disc comprises a conical shape that corresponds to the second connection so that automatic threading-in of the valve disc in the second connection is ensured when the valve is being closed.

In this way automatic threading-in and precise seating of the valve disc in its seat is achieved.

According to a further exemplary embodiment of the present invention the wash basin is a wash basin of an aircraft toilet or of an aircraft galley. Furthermore, the vacuum waste-water system is a vacuum waste-water system in an aircraft.

According to a further exemplary embodiment of the present invention the use of a transfer unit, as described above, in an aircraft is stated.

The use of such a transfer unit in an aircraft can result in there no longer being any need to provide a drain mast. This can lead to improved stability, lighter weight, improved fuel consumption and reduced air resistance.

Furthermore, a method for the disposal of grey water from a wash basin to a vacuum waste-water system is stated, with the method comprising the steps of connecting a transfer unit to an outlet of the wash basin, connecting the transfer unit to the vacuum waste water system, and independent draining of grey water, held in interim storage in the transfer unit, from the wash basin to the vacuum waste-water system when the grey water held in interim storage in the transfer unit exceeds a specified fill level height.

The grey water can thus independently drain from an interim storage space to a vacuum waste-water system, without there being a need for external control of draining. This does not require a drain mast.

According to a further exemplary embodiment of the present invention the method comprises automatic pulling-upwards of the floating body with the valve disc by means of a bistable electromagnet so that the valve disc moves away from the second connection, thus releasing the vacuum waste-water system in the case of insufficient energy supply or in the case of system failure.

In this way, opening of the valve and thus drainage of the grey water held in interim storage is ensured even in those cases where a malfunction within the vehicle occurs.

According to a further exemplary embodiment of the present invention the method further comprises the step of selectively opening the valve by means of a control valve block with a vacuum connection, wherein the control valve block for opening the valve sucks the floating body upwards so that the valve disc moves away from the second connection, thus releasing the vacuum waste-water system.

This makes it possible, for example, to externally trigger the discharge of the transfer unit, for example if the floating body becomes stuck (due to dirt deposit or due to icing). By applying a vacuum the floating body and thus the entire valve can be freed.

Further exemplary embodiments of the present invention are shown in the subordinate claims.

BRIEF DESCRIPTION OF THE DRAWINGS

Below, the invention is described in more detail by means of exemplary embodiments with reference to the drawing.

The FIGURE shows a diagrammatic cross-sectional view of a transfer unit according to an exemplary embodiment of the present invention.

DETAILED DESCRIPTION

In the following description of the figures, the same reference characters are used for identical or similar elements.

The FIGURE shows a diagrammatic cross-sectional view of a transfer unit according to an exemplary embodiment of the present invention. The transfer unit 100 essentially comprises a top housing part 1 and a bottom housing part 16. Furthermore, an inlet 5 is provided, which connects the bottom housing part 16 to an outlet of a wash basin 17. Furthermore, a second connection 15 is provided, which connects the underside of the bottom housing part 16 to a vacuum waste-water system 7.

The bottom housing part 16 is used for the interim storage of grey water that is fed in, by way of the inlet 5, from the wash basin or from a sink. The fill level of the grey water held in interim storage can, for example, be monitored by way of a fill level meter 19, which is arranged within the bottom housing part 16. However, such a fill level meter 19 is not necessary.

The valve unit 2, 6, 9 comprises a floating body 9 with a roll membrane 2 and a valve disc 6. The valve unit 2, 6, 9 can move up and down in order to open and close the connection 15 to the vacuum waste-water system 7. In order to further improve the tightness of the seal, one or several sealing rings 8 are provided, which are affixed either to the valve disc 6 or to the inside of the bottom housing part 16.

The top housing part 1 and the bottom housing part 16 are disconnectably connected to each other by way of the connecting flange 4 and the seal 3 so that corresponding maintenance of the valve unit 2, 6, 9 and of the other devices accommodated within the housing is ensured.

In order to ensure the opening of the valve 2, 6, 9 even in the case of a power failure or some other malfunction, a bistable electromagnet 12 is affixed in the top housing part 1, wherein said electromagnet 12 is affixed, by way of a tension cable, to the floating body 9 on a fixing device 10. In the case of a power failure, or in the case of insufficient energy supply or the like (which is, for example, signalled by the switching of a relay) the bistable electromagnet 12 pulls the floating body upwards by way of the tension cable 11 in order to open the outlet 15 to the vacuum waste-water system 7.

Furthermore, a valve block 13 with vacuum connection 14 is provided, which is controllable by way of a control device, e.g. in the valve block. The control device (not shown in The FIGURE) can, for example, be an electronic control device that is connected to a central control unit (not shown in The FIGURE). Furthermore, an airing and de-airing device 18 is provided.

The transfer unit 100 shown in The FIGURE can be used for the disposal of kitchen grey water and toilet grey water in aircraft, water craft and terrestrial vehicles.

The transfer unit 100 comprises a round lightweight container 1, 16 which can be made from metal or from a plastic material, and which as a result of its shape prevents dead space. In this way an even outflow of the collecting grey water is ensured. Within the container there is the floating body 9 with roll membranes 2 and valve disc 6 which closes off the container towards the bottom outlet 15.

As already described, the seal comprises a suitable sealing means 8, for example an o-ring. The movable floating body 9 is designed so as to be vibration resistant. The two roll membranes are designed such that they hold the floating body in position during vibrations. An air tank (air cushion) is used in the floating body, which air cushion floats at the very moment in which the transfer unit 100 has attained its maximum fill limit.

For this function the transfer unit 100 does not require any sensor measuring technology or any electrical drives.

In order to reduce the volume of the floating body 9, vacuum equalisation can be applied to the connection 14, which vacuum equalisation counters the negative pressure at the outlet 7.

Furthermore, applying a vacuum 14 can force the valve 2, 6, 9 to open.

The transfer unit 100 is filled by means of an inlet 5.

In order to make it possible to completely empty the transfer unit 100 in a case of emergency or when the vehicle is parked in sub-zero temperatures, the top connection 14 with a valve body 13 is connected to the vacuum system 7, which vacuum system 7 in this case conveys the toilet waste water from the aircraft into the waste tank. In the case of drainage, the valve 13 is operated, and the vacuum moves the floating body 9 upwards by means of suction, as a result of which the transfer unit 100 automatically discharges. This procedure can be repeated any number of times at determined time intervals so that freezing or odour formation can be prevented.

In the case of a complete switch-off of the system, the bistable electromagnet 12 acts such that it pulls the tension cable 11 upwards, which by way of the fixing device 10 results in the floating body 9 being lifted. Consequently the valve disc 6 is pulled from the valve seat, and the transfer unit 100 empties.

For assembly and for maintenance work the transfer unit 100 comprises two parts 1, 16, which are connected to each other by way of the connecting flange 4 and seals 3.

The transfer unit 100 completely replaces the conventional drain mast and drains the waste water from wash basins to the vacuum waste-water system 7.

The purely mechanical function and the simple design of the transfer unit 100 result in low susceptibility to malfunction and in a long service life of the device. No electrical components, such as sensors, are used, as a result of which maintenance costs are reduced while reliability is improved.

Thanks to its special shape, the transfer unit 100 cannot become clogged. Impeccable operation and the ability to provide a tight seal is thus ensured for extended periods. The precisely fitting roll membrane/cylinder combination ensures excellent vibration resistance and resistance to dirt build-up.

Automatic discharging of the transfer unit 100 is implemented by means of a simple module (valve block) by way of the vacuum system. If there is no electrical current, a bistable electromagnet switches the system to "Open".

In addition it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A transfer unit for a vehicle, for the disposal of grey water from a wash basin to a vacuum waste-water system, with the transfer unit comprising:
    a first connection arranged for connecting the transfer unit to an outlet of the wash basin;
    a second connection arranged for connecting the transfer unit to the vacuum waste-water system;
    a self-opening valve with a floating body, arranged for independent drainage of grey water, which has been held in interim storage in the transfer unit, from a wash basin to the vacuum waste-water system when the grey water held in interim storage in the transfer unit exceeds a predetermined fill level height;
    wherein the self-opening valve comprises a valve disc for sealing the second connection;
    wherein the valve opens in that the valve is pulled upwards by the floating body floating in the grey water, when the predetermined fill level height is reached; the transfer unit further comprising:
    a control valve block with a vacuum connection;
    wherein the control valve block is arranged for selective opening of the valve; and
    wherein the control valve block for opening the valve sucks the floating body upwards so that the valve disc moves away from the second connection, thus releasing the vacuum waste-water system;
    wherein the floating body comprises a roll membrane;
    wherein the roll membrane is arranged for rolling off an inside of a housing and for sealing a transition between the floating body and the inside of the housing.

2. The transfer unit of claim 1,
    wherein the valve disc seals the second connection so that, after a complete seal has been established, no grey water flows from a buffer storage space of the transfer unit to the vacuum waste-water system.

3. The transfer unit of claim 1,
    wherein the roll membrane provides the floating body with inner stability.

4. The transfer unit of claim 1,
    wherein the roll membrane provides a defined restoring force to the floating body with the valve disc, from an open position back to a closed position.

5. The transfer unit of claim 1, further comprising:

a top housing part and a bottom housing part, wherein the housing parts are disconnectably connected by way of a connecting flange with seal.

6. The transfer unit of claim 1, further comprising:

a bistable electromagnet, which in the case of insufficient energy supply or in the case of system failure automatically pulls the floating body together with the valve disc upwards so that the valve disc moves away from the second connection, thus releasing the vacuum waste-water system.

7. The transfer unit of claim 1,
wherein the valve disc comprises a conical shape that corresponds to the second connection so that automatic threading-in of the valve disc in the second connection is ensured when the valve is being closed.

8. The transfer unit of claim 1,
wherein the wash basin is a wash basin of an aircraft toilet; and
wherein the vacuum waste-water system is a vacuum waste-water system in an aircraft.

9. The transfer unit of claim 1 in an aircraft.

10. An aircraft comprising a transfer unit of claim 1.

* * * * *